March 4, 1958      W. A. DOCKHORN      2,825,264
STEREOSCOPIC MOVIE VIEWING DEVICE
Filed Aug. 17, 1953
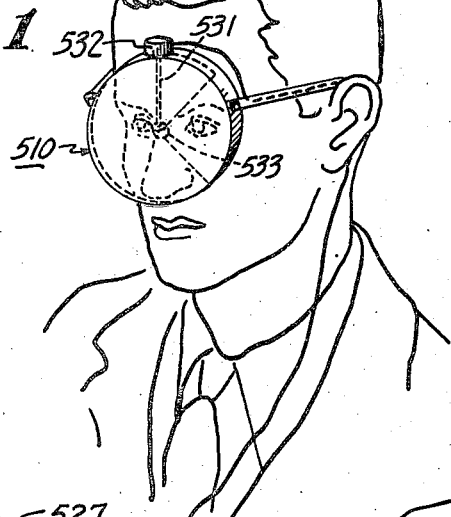
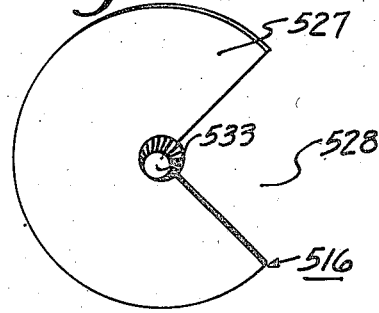
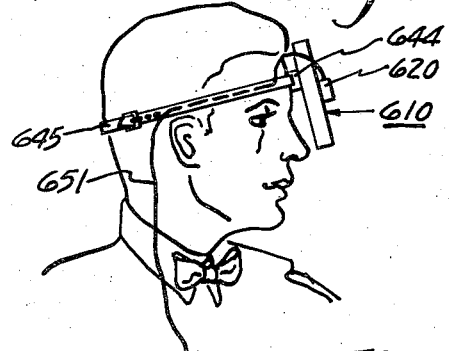
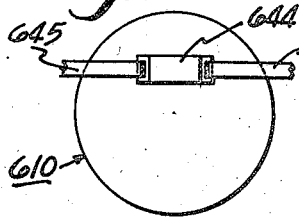
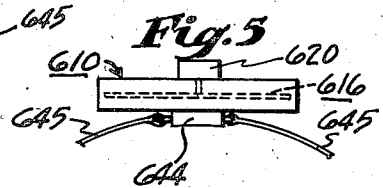
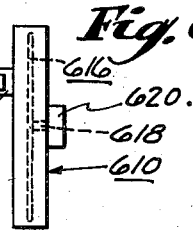
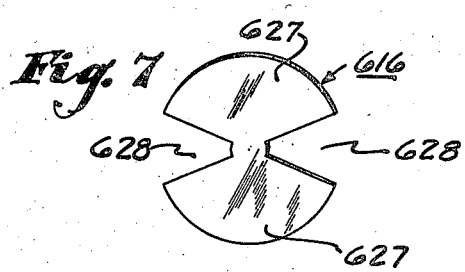
INVENTOR.
WAYNE A. DOCKHORN
BY John Ewbank
ATTORNEY

United States Patent Office 2,825,264
Patented Mar. 4, 1958

2,825,264
STEREOSCOPIC MOVIE VIEWING DEVICE

Wayne A. Dockhorn, Huntingdon Valley, Pa.

Application August 17, 1953, Serial No. 374,778

1 Claim. (Cl. 88—16.6)

This invention relates to stereoscopic viewing apparatus employing rotating disc shutter means. Reference is made to copending applications Ser. No. 374,776 and 374,777, now Patent No. 2,810,318, filed by the same inventor on related subject matter.

One of the most widely known methods of projecting three dimensional motion pictures has employed polarized light. Many spectators have objected that the observation of such three dimensional movies thru viewers having polarized filters resulted in eye fatigue. It is an object of the present invention to provide a viewing apparatus for observing three dimensional movies which produces a minimum amount of eye fatigue for the spectator.

In observation of three dimensional television, because of the extremely short blackout period between fields it is essential that there be an effective alternate observation by the right and left eyes, so that the use of rotating disc shutter means requires the substantial elimination of dual transparency of right and left eye views. However, in the observation of three dimensional motion pictures, the entire picture is projected simultaneously. Thus, it is possible to provide a longer period during which no frame is shown on the screen by either of the two projectors of the films. During the blackout of the screen by reason of no light from the two projectors, both windows of the stereoscopic viewers employed by the spectators can be transparent without significant adverse effect.

In all stereoscopic systems employing mechanical shutters in the viewers, it is essential that the shutter of the viewer be synchronized with the projection system. The use of synchronous electric motors to rotate the viewer disc at a predetermined speed is the standard practice. In certain embodiments of the invention, the motor is also actuated by a periodic synchronizing signal to maintain the viewer in phase with the projector.

Heretofore, some of the stereoscopic viewers have provided light tubes through which the spectator was expected to observe the movies. Some spectators have objected to the constraining effect of the light tubes and have found that they were annoyed and tired by the masking devices restricting the view to the relatively small windows. It is an object of the present invention to provide a stereoscopic viewer having substantially no stationary masking screen positioned forwardly of the eyes of the spectator, and having all such stationary portions constructed of transparent material. The motor and power transmission means, altho opaque are positioned in such a manner as to not constrain the field of vision.

Particular advantages are achieved by having the rotating shutter mounted on a headgear. Thus it is possible to position the rotating shutter very close to the eyes and have it movable therewith, whereby a smaller disc can provide an adequate field of vision.

In the drawings, Figure 1 is a perspective view of an embodiment of the invention showing the motor rotating the disc within a transparent housing.

Figure 2 is a plan view of a rotatable disc of the embodiment of Figure 1.

Figure 3 is a side view of a preferred embodiment of the present invention.

Figure 4 is a rear plan view of a shutter mechanism shown in Figure 3.

Figure 5 is a top view of the shutter mechanism of Figure 4.

Figure 6 is a side view of the shutter mechanism shown in Figure 4.

Figure 7 is a plan view of a rotatable disc of Figure 4.

Referring now to Figures 1 and 2, it will be seen that there is a housing 510 on which is mounted an electric motor 532 rotating a disc 516 through a drive shaft 531 and gears 533. The disc 516 includes a transparent section 528 and an opaque section 527 substantially three times as large as the transparent section 528. Because the motor rotates the disc, the opaque section is merely schematic in Figure 1. Particular attention is directed to the fact that the housing 510 is made entirely of transparent material and provides substantially no masking screen forwardly of the eyes of the spectator. If desired, the housing can be made of glass, shatterproof glass, or quartz, but in order to decrease weight and increase safety, is preferably made of plastic, that is, macromolecular organic structural material. By reason of provision of completely transparent apparatus, except for the power transmission means, it is possible for the spectator to observe three dimensional movies without the tiring effect which might result from looking through narrow windows or light tubes tending to constrain the field of vision of the spectator.

In the operation of the apparatus of Figures 1 and 2, the dual projectors provide a black-out of the auditorium and an absence of any showing of the picture on the screen during the portion of the rotation of the disc 516 during which the transparent section 528 passes thru the zone of separation between the eyes of the spectator.

In the preferred embodiment shown in Figures 3 to 7, a rotating disc 616 is provided with two transparent sections 628 each of about 45°, and with two opaque segments 627 of about 135°. The disc 616 rotates on the axle 618 and is driven by the motor 620. The housing 610 is transparent and the spectator is able to look through the lower half thereof without noticing any kind of mask or blinder restricting the field of vision. The power transmission means comprising the motor 620 and axle 618 are so positioned as not to constrain the field of vision significantly. During the showing of three dimensional movies, the projections of the pictures for the right eye and left eye are both obscured during that portion of the rotation of the disc 616 during which the transparent section 628 passes through the general zone of the bisecting plane between the spectator's eyes.

A forehead member 644, which may include a curved sponge rubber pad, is attached to the housing 610. The forehead member has attached to it an adjustable band 645 extending around to the rear of the spectator's head.

In the operation of the viewer, the spectator's eyes are able to see through the transparent housing 610 without any stationary shutter or blinder restricting the field of vision. Thus, in the operation of the device, the eyes are not readily fatigued and this is true even for those individuals annoyed by a stationary mask constraining the field of vision.

If the ratio of opaque section 627 to transparent section 628 is different from the three to one ratio previously referred to, the device is significantly less advantageous, altho still operable. If the angle subtended by the opaque section is less than three times as great as that of the transparent section, the blackout period must be longer and the light intensity during the short projection time must be greater than in the preferred embodiment. If the transparent segment is less than one third the opaque segment, the blackout period can be shorter, but the intensity of illumination must again be greater because at any moment a smaller portion of the window is transparent.

The motor preferably includes means responsive to a periodic synchronizing signal transmitted from the projectors, whereby the disc rotates not merely at the same speed, but also exactly in phase with the corresponding elements of the projector.

The invention claimed is:

An apparatus for viewing three dimensional movies comprising supports secured to the head of the spectator; a cylindrical housing having a lower semicircular portion and an upper semicircular portion, said housing being entirely of transparent material, and said housing being carried entirely by said supports in such a position that none of the upper semicircular portion and only a portion of the lower semicircular portion of the housing is within the fields of vision of the spectator's eyes, whereby no portion of the housing tends to constrain the field of vision of the spectator; a disc rotatably mounted about an axis above the eye level, said axis being in the vertical bisecting plane between the spectator's eyes, said disc comprising two approximately 135° opaque sectors diametrically opposed thereby defining two approximately 45° transparent sectors diametrically opposed and said disc being rotatably mounted within said transparent housing; an electric motor mounted on said housing and rotating the disc at a speed synchronized with the projection of the right and left eye frames of the three dimensional movie, the absence of any movie projection being in phase with the rotary movement of the transparent sectors so that there is no movie projection while the transparent sectors move through the vertical bisecting plane between the spectator's eyes and while the transparent sectors move through the horizontal plane of the axis of rotation of the disc.

References Cited in the file of this patent

UNITED STATES PATENTS

| | | |
|---|---|---|
| 1,506,524 | Hammond | Aug. 26, 1924 |
| 2,273,512 | Caldwell et al. | Feb. 17, 1942 |
| 2,384,259 | Quinby | Sept. 4, 1945 |
| 2,384,260 | Goldsmith | Sept. 4, 1945 |
| 2,478,598 | Somers | Aug. 9, 1949 |
| 2,649,019 | Hartline et al. | Aug. 18, 1953 |

FOREIGN PATENTS

| | | |
|---|---|---|
| 17,955 | Great Britain | of 1907 |
| 444,839 | Great Britain | Mar. 30, 1936 |